(No Model.) 5 Sheets—Sheet 2.
T. J. MERRITT.
PHOTOGRAPH GALLERY WAGON.
No. 467,423. Patented Jan. 19, 1892.
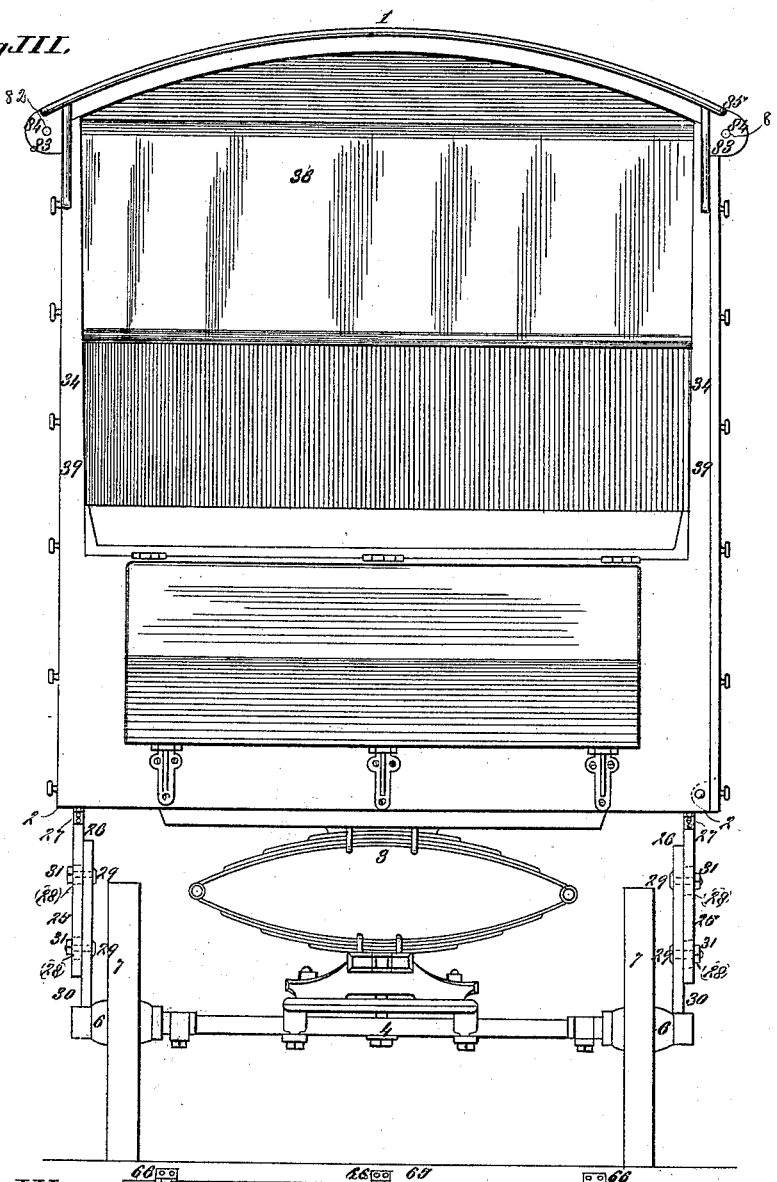
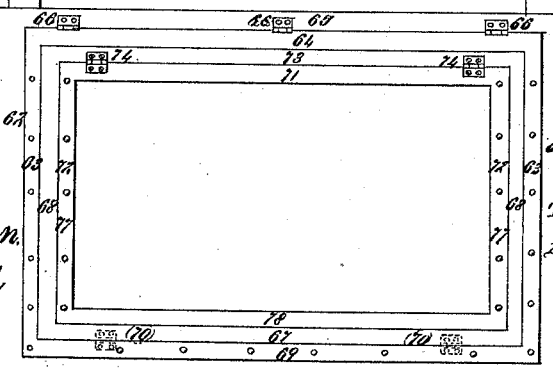
Attest:
Walter E. Allen
M. E. Ourand
Inventor:
Thomas J. Merritt
By Knight Bros.
Attys.
THE NORRIS PETERS CO., PHOTO-LITHO., WASHINGTON, D. C.

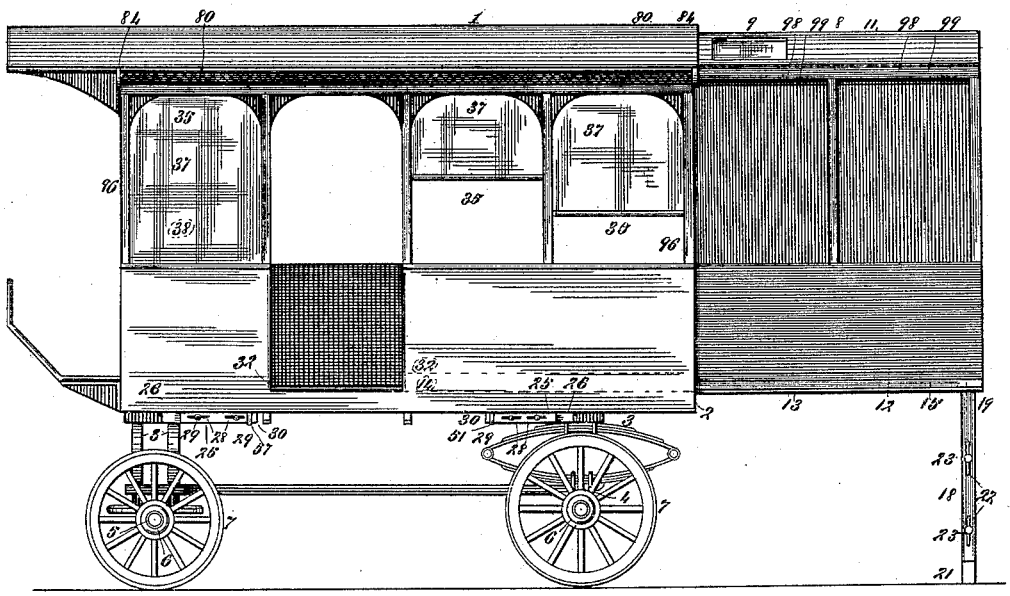

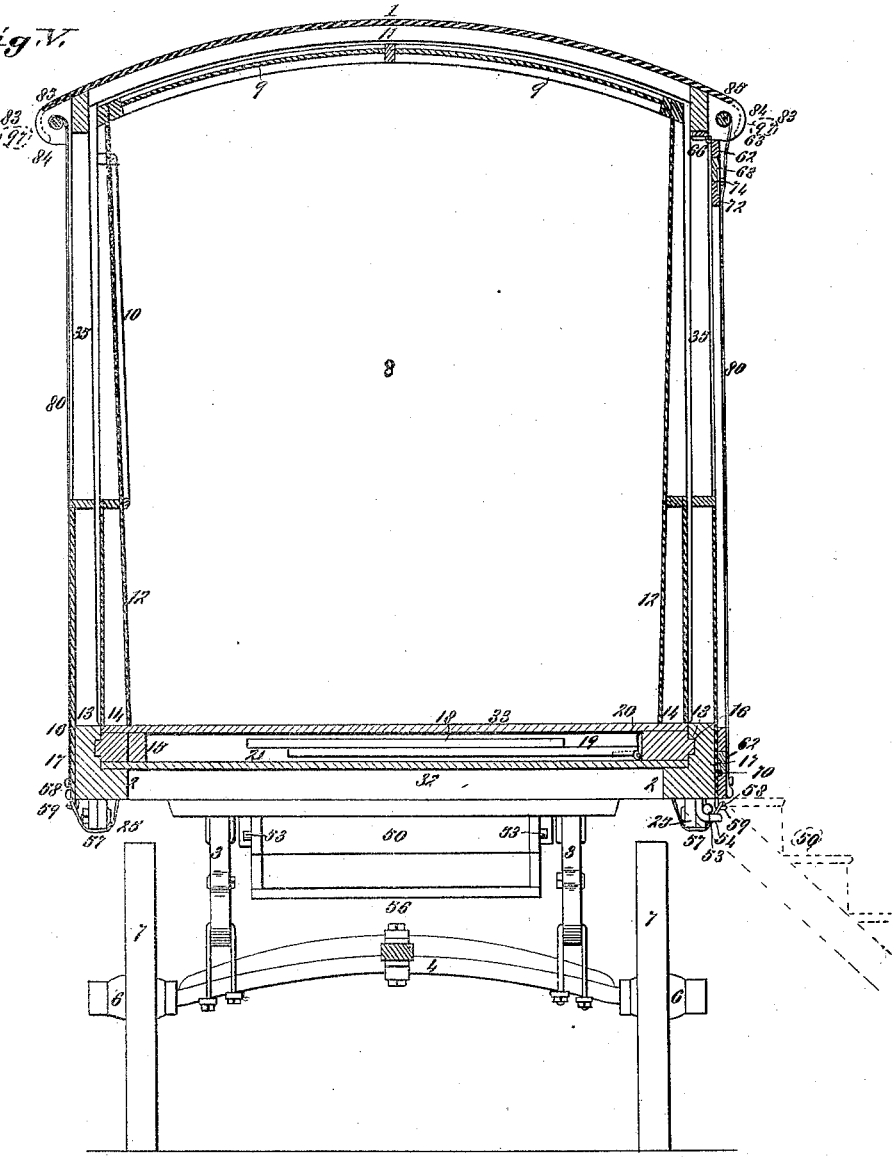

(No Model.) 5 Sheets—Sheet 4.
T. J. MERRITT.
PHOTOGRAPH GALLERY WAGON.
No. 467,423. Patented Jan. 19, 1892.
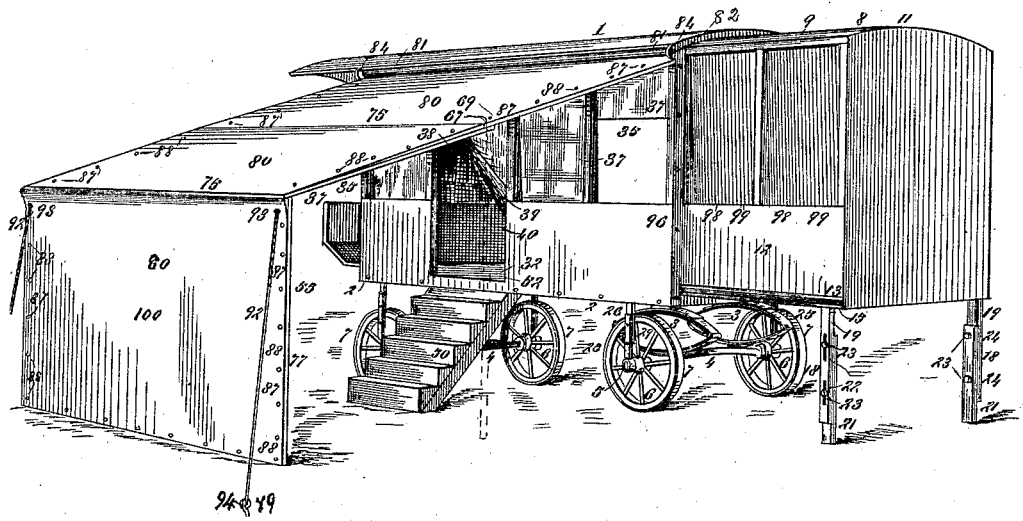
Fig.VII
Attest:
Walter E. Allen.
M. E. Ourand.
Inventor:
Thomas J. Merritt.
By Knight Bro's.
atty's.

(No Model.)  5 Sheets—Sheet 5.
T. J. MERRITT.
PHOTOGRAPH GALLERY WAGON.
No. 467,423.  Patented Jan. 19, 1892.
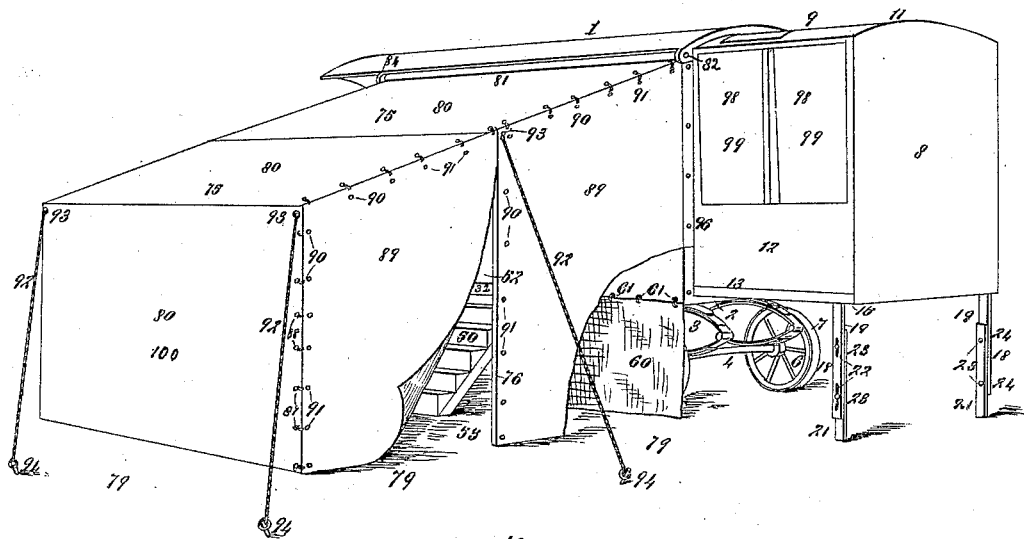
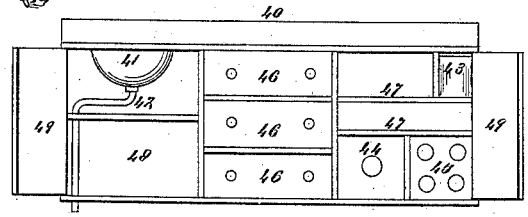
Attest:
Walter E. Allen
M. E. Ourand
Inventor,
Thomas J. Merritt
By Knight Bro's
atty's.
THE NORRIS PETERS CO., PHOTO-LITHO., WASHINGTON, D. C.

UNITED STATES PATENT OFFICE.

THOMAS J. MERRITT, OF ST. LOUIS, MISSOURI.

PHOTOGRAPH-GALLERY WAGON.

SPECIFICATION forming part of Letters Patent No. 467,423, dated January 19, 1892.

Application filed August 21, 1891. Serial No. 403,323. (No model.)

*To all whom it may concern:*

Be it known that I, THOMAS J. MERRITT, of the city of St. Louis, in the State of Missouri, have invented a certain new and useful Improvement in Itinerant Extension Photograph-Galleries, of which the following is a full, clear, and exact description, reference being had to the accompanying drawings, forming part of this specification.

This invention relates to an itinerant photograph-gallery with a telescopic sliding extension operating-room that slides within the gallery-wagon when itinerating and slides out when stationed for operating, and which gallery-wagon is provided with a triple flap, which forms a sectionally-hinged folding side that opens out when stationed for operating to constitute an awning that consists of an extension roof and wall to inclose a waiting and reception room; and the invention consists in features of novelty hereinafter fully described, and pointed out in the claims.

Figure I is a side elevation of the gallery-wagon, and shows the telescopic extension slid out and its outer end supported by its adjustable drop-legs. Fig. II is a like view with said extension slid in and the ascending-steps of the gallery stowed away beneath the bed of the wagon ready for traveling. It also shows the side curtains partly lowered. Fig. III is an enlarged front elevation of the wagon, and shows the driver's seat and step, and the screw-adjusted supports that level the gallery and keep it from teetering or swaying. Fig. IV is an enlarged closed view of the hinged folding awning-frame, and shows the interjacent positions of the folded frame-sections. Fig. V is an enlarged vertical section taken on line V V, Fig. II, and shows the gallery-wagon with the extension telescoped in its retired position. It also shows one of its pendent legs elevated and housed between the extension-floor and the main floor of the wagon. Fig. VI is an enlarged detail and shows the two adjustable supporting-legs hinged to the bed of the extension-frame. Fig. VII is a perspective view of the gallery-wagon stationed for operation and with the extension-room drawn out and supported at its outer end by the adjustable locked legs. It also shows the folding-frame awning extended to cover the reception-room, with the curtain of the dark-room folded back for the entrance of the operator into its interior. Fig. VIII is a perspective view of the gallery-wagon set in operative position, the extension-room drawn out, the awning unfolded, and with its curtains inclosing the supplemental reception-room, one corner of a curtain raised to allow entrance into said room, with part of a curtain broken away to show the skirting curtain from the bed of the wagon. It also shows the guy-ropes that brace the awning; and Fig. IX is a front elevation of the depository-box, in which are located the wash-sink and the bath, and in which are deposited the cameras and other instruments and the chemicals, &c.

Referring to the drawings, 1 represents the covered body of the wagon that incloses or constitutes the gallery proper, and the bed-frame 2 of which is supported on springs 3, that are mounted on the axles 4, whose spindles 5 are journaled in the hubs 6 of the wheels 7 on which the wagon runs.

8 represents a sliding telescoping sitting-room, in which the subject sits while the impression is being taken, at which time the said room is slid out into the position shown in Figs. I, VII, and VIII, and the skylight 9 and side light 10, respectively, located in the the roof 11 and side 12 of said telescopic sliding section are exposed to the passage of the rays of the sun to effect the photographic impression. The base-tongues 13, that project outwardly from the side sills 14 of the bed-frame 15 of said telescopic sitting-room 8, run in the grooves 16 in the main side bed-sills 17 of the bed-frame 2 of the gallery-wagon. The said extension sitting-room 8 can thus be freely slid out of its retired position in its telescopic seat within the main body of the wagon from the position shown in Figs. II and V to the extended position shown in Figs. I, VII, and VIII, its inner end still resting on the bed-frame of the wagon, and its outer end is supported by the adjustable legs 18, which legs are made of corresponding sliding sections. The fast ones 19 of said sections are secured by hinges 20 to the side sills 14 of said extension sitting-room, and the adjustable sections 21 are secured to said hinged sections by the following means: The hinged sections are provided with elongated slots 22, and set-screws 23 pass through said slots and through perforations in the adjustable sections 21 and engage in screw-nuts 24, which nuts clamp against said sections 21 and the heads of said set-screws against the sections 19 to rigidly hold the two sections together at the joint length to which they are adjusted to compensate inequalities in the surface of the street, so as to secure a level set for said exhibition-room. When the extension-room is slid into its retired position, the pendent legs 18 are folded up on their hinges 20 and rest on the main floor 32 of the wagon-bed between it and the floor 33 of the extension-room, the said drop-legs being thus housed out of danger and out of the way when the extension-room is retired and the gallery-wagon is itinerating.

25 represents adjustable drop-legs for leveling and steadying the main body of the wagon when stationed for operating. The fast sections 26 of said legs are secured in vertical position above the hubs of the wheels by hinges 27 to the under sides of the main bed-sills of the wagon-body. The said hinged sections are provided with elongated slots 28, and set-screws 29 pass through said slots and through perforations in the adjustable sections 30 of said drop-legs and engage in screw-nuts 31 to tightly clamp the adjusted joints of said drop-legs to the required length to level the gallery wagon-body by the seating of the feet of said drop-legs on said hubs, and thus also to steady the gallery-wagon during the use of the camera. The said set-screws can be put through from either way, the head against the hinged section or against the adjustable section.

The steadiness of the gallery-wagon is of great importance, so that the necessary movements of the artist while attending to the camera, &c., may not vary the focus while taking the impression, and it is also important that both the main and the extension floors should be level, for which reasons the use of the above-mentioned adjustable drop-legs is apparent.

34 represents the front window, and 35 the side windows of the gallery-wagon. 36 is the roller-blind to said front window, and 37 the roller-blinds to the side windows, which blinds are preferably provided with spring-tension winds.

38 represents the dark-room at the front end of the gallery-wagon, which room is darkened, when required, by the closing of said front blind and of the forward side blinds, and also the closing of the transverse blind 39, that reaches clear across the wagon at the rear of said dark-room. 40 represents the depository-box in said dark-room, in which box is located the wash-sink 41, the drain 42 from said sink, the immersion-tank 43, the single-focus camera 44, and multiple camera 45, with drawers 46, shelves 47, and cupboard 48 for the depositing of any other instruments, chemicals, &c., and 49 are the folding-doors that close the front of said depository-box. When itinerating from place to place, the said depository-box makes a convenient seat for the driver and artist.

50 represents steps for ascending to the door 51 and doorway 52 of said gallery-wagon. The said steps are detachably secured by hanger-bolts 53, which engage in the pendent hooks 54, beneath the bed-frame of the gallery-wagon, when said gallery is stationed for operation, the said steps leading up from the reception-room 55 (or rooms, if said room is duplicated, as it may be at the other side of the gallery-wagon) with its inclosures specified below. When, however, the said gallery-wagon is arranged for itinerating from place to place, the said steps are unhung and are housed and secured between the rear springs under the bed of the wagon at 56. (See Figs. II and V.) If there is a duplicate reception-room at the other side of the wagon, and in consequence a duplicate set of steps, said duplicate steps are also housed and secured in the unoccupied space seen in Fig. II, ahead of the other set, beneath the bed of the wagon.

57 represents latchet-straps clearly shown in the enlarged view in Fig. V, and also shown in Figs. I and II, the fast end of which straps are secured to the bed-frame of the gallery-wagon at a suitable distance from the hinged or pivot bolt suspension of the drop-legs 25, so that when said legs are swung up on their pivot-hinges from their operative position (shown in Figs. III and VII) to their inoperative position, when the wagon is ready for itinerating (shown in Figs. I, II, and V,) the said latchet-strap is made to engage around the loose end of said drop-legs, and the eyelets 58 of said latchet-straps are secured on the pendent hooks 59, that project from beneath the bed-sills of the wagon, thus securely holding said drop-legs captive from interference with the rotation of the wheels when itinerating.

60 represents skirting-curtains that are hitched onto and suspended from the button-hooks 61, that project from the sides of the gallery-wagon bed. These skirting-curtains, hanging pendent from the whole length of the wagon, largely shuts off the draft from under the wagon and adds to the privacy of the reception-room.

62 represents triple folding rectangular frames, the upper side of the outer rectangle 63 of which is secured to the top side bar 64, that supports the side of the gallery-wagon roof 65 by the hinges 66. The under side bar 67 of the secondary inclosed rectangle frame 68 is secured to the under side bar 69 of the outer frame by the hinges 70, and, lastly, the upper bar 71 of the tertiary inner frame 72 is secured to the upper bar 73 of the secondary frame by the hinges 74. Now it will be seen that when the lower side of the triple suspended frame is elevated, as shown in Figs. VII and VIII, and the secondary, with its inclosed tertiary-frame, is then unfolded down and then up on the right slant for the awning-roof 75 of the reception-room, as shown in said figures. Then the hinge-carrier bars 67 and 69 lap and brace against each other, besides which they are supported at their junction by the middle vertical sustaining-posts 76. The tertiary or inner frame is then unfolded on its hinges so as to hang pendent in a vertical position and make the frame of the outer wall 100, its lower side bar 78 resting on the surface of the street or ground 79, as shown in said figures, and the end bars 77 of said frame supporting the corners of the roof. I have shown said nest of infolded frames extending the length of the wagon-body on one side of said wagon in the enlarged view in Fig. V; but I do not confine myself to its use on one side only, for it is used on both sides when a secondary reception-room is required.

80 represents large awning-curtains that reach over said cluster of rectangular frames. (See Figs. I, II, V, VII, and VIII.) The said awning-curtains are preferably made of waterproof material, so as when drawn out to make a tight roof and wall to said reception-room on either one or both sides of the wagon. The upper end of the curtains are secured to large rollers, whose journal-pins 82 run in bearings 83 in the box-lugs 84, that are secured to and project from the eaves 85 of the roof of the gallery-wagon, and windlasses secured by the customary means to said rollers, wind up the awning-curtain when the reception room or rooms are for a time no further needed and the gallery wagon is being condensed preparatory to itinerating. When said awning-curtain is drawn out over the system of rectangular frames 62, the button-holes 87 along its margins are made to engage with the buttons 88 on said frames, so as to secure a close tight hold of the curtain to the frame that supports it. A curved guard-plate 97 extends from the eaves in front of the curtain-roll.

89 represents pendent sectional side curtains, each section of which is secured by button-holes 90 to the buttons 91, respectively, on the ends of the gallery-wagon on the middle supporting-bar 76 and on the end bars 77 of the tertiary inner frame, which bars constitute the out corner-posts of the reception-rooms.

92 represents guy-ropes that are secured at top to the eyelet-bolts 93 on the rectangular folding frame, and are inclosed at bottom by the eyelet-spikes 94, to which their lower ends are secured, the said spikes being driven into the ground to safely moor the awning and walls of the reception-rooms. One corner or side of one of the end curtains 89 can be left unbuttoned, so as to unfold it to allow the passage of persons in and out of the reception-room.

When it is desired to use the large awning-curtain for closing in or partially closing in the sides of the gallery-wagon—as, for instance, when traveling in cold weather—the curtain may be drawn down vertically as far as desired and buttoned to the corner-posts 95 of the wagon-body, as shown in Fig. II, or if the cluster of folding frames are attached to that side and hanging vertically pendent therefrom, then it is secured to the projecting buttons on said frame.

The operation of the device has been pretty fully pointed out through the specification of its constituent parts, to which I call attention to avoid repetition.

It will be seen that the invention provides means for packing or condensing its numerous parts into the small compass of the wagon-body for itinerating, in which condition, also, it has all the advantage of its spring-suspension for traveling when said elastic suspension to prevent the jarring of the delicate cameras and other instruments is an actual necessity, and it will also be seen that when stationed for operation the various parts capable of extension are readily drawn out and firmly secured, so that the whole expanded erection is more firmly held and braced than in its condensed inoperative condition, and effective means are also provided for preventing the teetering of the springs for adjustably leveling the gallery and for firmly holding it to said level, so that there can be no adverse movement to vary the focus of the cameras while taking their impression, or to change the line of reception of the sun's rays while printing, both of which are important points in photography.

98 represents side windows in the extension sitting-room on the opposite side to that in which the side light 10 for the reception of the sun's rays is located, and which windows are generally shaded with curtains 99.

When sufficiently light awning-curtains 80 are used, coil-springs may be attached to their rollers 81, instead of the windlasses 86 shown, and the curtain, when started, will thus spring-wind itself after the manner of the ordinary spring-curtain; but it is evident that in heavy constructions the windlass-wind I have shown will be more reliable.

I claim as my invention—

1. In an itinerant photograph-gallery, the combination of the gallery-wagon and the extension telescopic sitting-room 8, the said room provided with the skylight 9 and the side light 10 for the admission of the sun's rays and the bed-frame of said extension-room having the projecting base-tongue 13, and the main bed-frame of the gallery-wagon provided with the grooves 16, in which said tongues slide when said sitting-room is extended or retires, substantially as and for the purpose set forth.

2. In an itinerant photograph-gallery, the combination of the gallery-wagon, the extension telescopic sitting-room 8, the adjustable drop-legs 18, provided with sliding extensions to level and support said extension-room, and the set-screws that fasten the adjustment of said drop-legs, substantially as and for the purpose set forth.

3. In an itinerant photograph-gallery, the combination of the gallery-wagon, the adjustable drop-legs 25, the pivots or hinges by which said legs are hung, the adjustable sections 30 of said legs, and the set-screws 29, that fasten the adjustment, arranged to level the main body of the gallery-wagon and hold it from teetering and vibration during the photographic process, the latchet-straps 57, provided with eyelets 58, and the pendent hooks 59 for holding up said drop-legs in their inoperative position, substantially as and for the purpose set forth.

4. In an itinerant photographic gallery, the combination of the gallery-wagon, the extension-room 8 at the rear of the wagon, the adjustable drop-legs 18, that level and support said extension-room, the hinges by which said legs are hung, the dark-room 38 in front of the wagon, the front window 34 and side windows 35 in said relative position to the dark-room, the curtains by which said windows are darkened, and the transverse blind 39, that completes the darkening of the dark-room, substantially as and for the purpose set forth.

5. In an itinerant photograph-gallery, the combination of the body of the gallery-wagon, the springs that support said body, the adjustable drop-legs 25, whose feet rest on the hubs of the wagon-wheels and hold the wagon-bed to its level and the springs from teetering during the photographic process, the dark-room 38, the curtained darkened windows about said room, the transverse blind 39, that completes the darkening of said room, and the depository-box in said dark-room, the said box containing the sink 41, the drain 42 from said sink, the immersion-tank 43, the housing 44 and 45 for the single and multiple focus cameras, and the other divisional depositories of said box, substantially as and for the purpose set forth.

6. In an itinerant photograph-gallery, the combination of the gallery-wagon, the dark-room of said wagon, and means for darkening the same, the depository-box 40 in said dark-room, the extension-room 8, the adjustable supporting-legs 18 of said extension-room, the adjustable drop-legs 25, the detachable ascension-steps 50, the hanger-bolts 53, and pendent hooks 54, that support said steps, substantially as and for the purpose set forth.

7. In an itinerant photographic gallery, the combination of the gallery-wagon, the telescopic extension sitting-room 8, the bearer box-lugs 84, that project from beneath the eaves of the wagon-roof, the large curtain-roller 81, whose journal-pins have bearings in said perforate lugs, the awning-curtain 80, the windlass 86, that winds said roller and the curtain mounted thereon, and the reception-room 55, which constitutes a waiting-room for the gallery, the said reception-room covered by said curtain, substantially as and for the purpose set forth.

8. In an itinerant photographic gallery, the combination of the gallery-wagon, the triple folding cluster of rectangular frames 62, the outer frame hinged to the side bearer-bar of said gallery-wagon roof, the secondary frame hinged to the outer frame, and the tertiary inner frame hinged to the secondary frame, the said frames arranged to open out, as shown in Figs. VII and VIII, to constitute a roof and wall support for an awning-cover of a reception-room for said gallery, the projecting buttons on said frames, the middle supporting-posts 76, that sustain the junction of said outer and secondary rectangular frames, the awning-curtain roller 81, mounted in bearings at the eave of said wagon-roof, and the curtain 80, mounted on said roller, said curtain arranged to draw out over said unfolded triplet rectangular frames and constitute a roof and wall cover therefor, and said curtain being provided with button-holes 87, that engage the buttons 88 on said triplet frames to hold said curtain in position, constituting the roof 75 and outer or end wall 100 of the reception-room 55, substantially as and for the purpose set forth.

9. In an itinerant photograph-gallery, the combination of the gallery-wagon, the triple folding cluster of rectangular hinged frames 62, hinged beneath the eaves of said wagon, the said frames arranged to unfold into the position shown in Figs. VII and VIII to form the frame of the roof 75 and wall 100, the curtain 80, that covers said triplet frame, the reception-room 55, that is thereby thus covered, the supporting-posts 76, the sectional side curtains 89, the buttons that secure said side curtains to said triplet frame, said supporting-posts and said wagon, the skirting-curtain 60, and the buttons 61, that project from the bed-sill of said wagon to which said curtain is secured, substantially as and for the purpose set forth.

10. In an itinerant photographic gallery, the combination of the gallery-wagon, the extension sitting-room 8, the triple folding cluster of rectangular hinged frames 62, the supporting-posts 76, the curtain-roller 81, the awning-curtain 80, mounted on said roller, the windlass that winds said curtain, the sectional side curtains 89, the reception-room 55, inclosed by said triple frames and curtains, the guy-ropes 92, the eyelet-bolts 93, and the eyelet-spikes 94, the said guy-ropes and eyelet bolts and spikes guying the awning-cover of said reception-room, substantially as and for the purpose set forth.

THOMAS J. MERRITT.

In presence of—
E. S. KNIGHT,
J. M. MAROT.